3,280,912
RESTORING LOST CIRCULATION IN WELLS

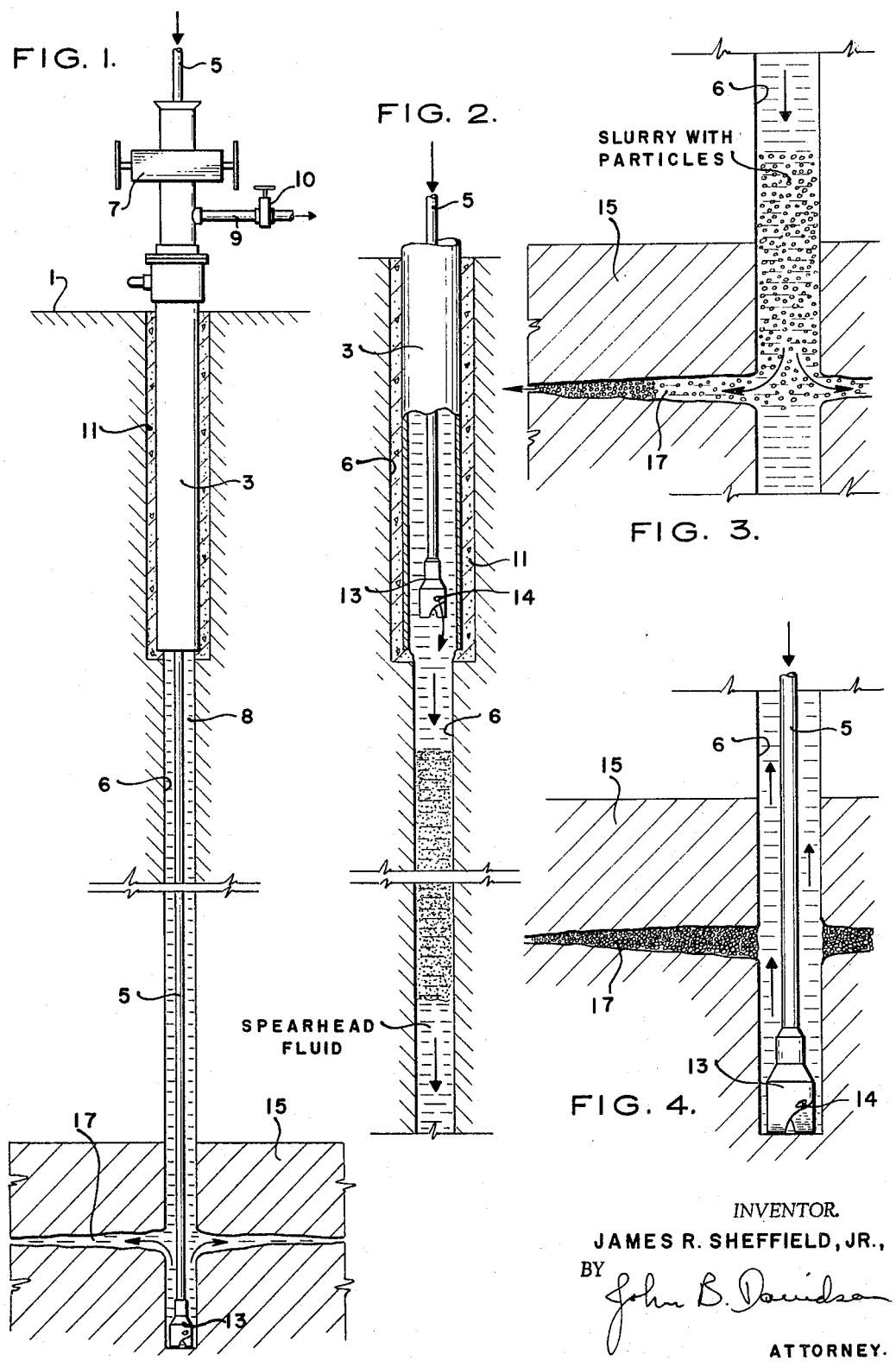

James R. Sheffield, Jr., Houston, Tex., assignor, by mesne assignments, to Esso Production Research Company, Houston, Tex., a corporation of Delaware
Filed Dec. 9, 1963, Ser. No. 329,010
5 Claims. (Cl. 166—29)

The present invention relates to earth drilling operations, and more particularly to the elimination of lost returns of drilling fluid.

In the usual rotary drilling technique followed for drilling a borehole into the earth, an elongated drill pipe is rotated while drilling fluid is circulated down the bore of the drill pipe and up the annulus thereabout. The drill pipe is provided with a heavy drill collar at the lower end thereof, to which a drill bit is affixed. The function of the drilling fluid is to carry drilled earth particles to the earth's surface, to cool the drill bit, and to control the well so as to prevent blowout in the event high pressure earth formations are penetrated.

It is not uncommon during drilling operations to lose circulation of drilling fluid. It is believed that often such loss of circulation is produced by accidental fracturing of the formation during the course of well operations. For example, rapid starting of pumps to commence circulation after a period of quiescence and pressure surges during vertical manipulations of the drill pipe have been recognized as causes for fracturing leading to lost circulation. Recognition of the fact that pressure surges from pipe handling and from starting up pumps has caused operators to take care in these operations, and as a result, the incidents of lost returns have been reduced by about 80%. The most serious, and the most difficult to mitigate, cause for lost returns results when the drilling fluid density is very great in order to hold the well in the quiescent state, so that the pressure caused by the weight of the drilling fluid column is only slightly less than the formation breakdown pressure. During the period of circulation the pressure drop in the circulating fluid plus the hydrostatic pressure of the fluid exceeds the formation breakdown pressure, causing fracturing and lost return.

A number of techniques have been developed for the purpose of restoring circulation, which techniques have often been unsuccessful. For example, various organic materials such as walnut hulls, citrus rind, bagasse, and the like have been dumped into the drilling fluid with the hope that they will form a plug to stop the loss of fluid. It is not unusual for such materials to be more harmful than beneficial inasmuch as they generally have a deleterious effect on the drilling fluid. In addition, attempts have been made to squeeze cement, which is a high filtration, solids-containing slurry, into fractures. However, since the cement slurry has high fluidity it is possible to extend the fracture indefinitely. Thus, large volumes of cement can be used in attempts to plug fractures without having any substantial effect on the ability of the formation to withstand the necessary pressure. Often, a technique called the "hesitation squeeze" is used. In this technique a given volume of cement is pumped into a fracture, the pumps are stopped for a time, and the cycle is repeated several times in an effort to attain the pressure increase required to strengthen the formation. However, when the pumps are stopped, the fracture usually closes on the unset cement, reducing the volume of the fracture to a minimum. When the pumps are started, the fracture reopens so that the cement enters the fracture and extends it further without forming a plug at or near the wall of the borehole. When multiple cement squeeze jobs have been performed certain wells have been known to require 20 to 30 such squeeze jobs before drilling can be resumed. Furthermore, the use of cement for the purpose of stopping lost returns suffers from the disadvantage that the excess cement remaining in the borehole after an operation must be drilled out. In addition, the cost of using cement is quite large regardless of the technique used in placement because time always must be allowed for the cement to set.

As has been mentioned above, a fracture is created because a formation will not withstand the pressure imposed upon it, and the fracture will continue to be extended as long as this pressure is maintained throughout the fracture area. Plugging of this fracture and building up solids to hold the mouth of the fracture open will increase the stresses around the borehole and prevent future breakdown in this area. The effect is similar to that of stressing metal to withstand further deformation.

In accordance with the teachings of the present invention, after the fractured zone has been encountered, there is formed at the earth's surface a saline slurry comprising salt water as a liquid vehicle, attapulgite clay, and diatomaceous earth, and between 80 and 150 pounds of angular, propping particulate material having a compressive strength at least equivalent to that of gilsonite per 42-gallon barrel of liquid vehicle. The particulate material has particle sizes in the complete range of 4 to 200 mesh. Fine particles of a size such that 85% pass through a 325-mesh screen may be added to impart weight to the fluid. These particles may be 0 to 600 pounds per barrel of liquid vehicle of barites or 0 to 500 pounds per barrel of particulate material. The fractured zone is opened by increasing the hydraulic pressure in the borehole and the slurry is forced thereinto until the pressure builds up to a predetermined level. This pressure is maintained for 30 minutes to 8 hours, and thereafter the hydrostatic pressure is reduced and circulation of drilling fluid is recommenced to build up the filter cake across the solid material bridging the fracture.

Objects and features of the invention not apparent from the above discussion will become evident upon consideration of the following more detailed description thereof taken in connection with the accompanying drawing, wherein:

FIG. 1 is a schematic elevational view of a well during drilling operations; and FIGS 2, 3, and 4 are fragmentary views of the well installation shown in FIG. 1, illustrating various steps in the technique of the invention.

With reference to FIG. 1, there is shown a borehole 6 which has been drilled from the earth's surface 1 to an earth formation 15 at an indeterminate depth. The borehole is shown as having been provided with a casing 3 to the surface of the ground which has been bonded to the sides of the upper portion of the borehole by means of a cement sheath 11. The drilling apparatus is shown schematically as including a drill pipe 5 extending through a blowout preventer apparatus 7, which includes rams for the purpose of closing the annulus around the drill pipe 5 in the event of an impending blowout. A mud return line, controlled by a valve 10, leading to a conventional mud pit is connected to the annulus around drill pipe 5. Drilling fluid is injected into the bore of the drill pipe 5 and the drill pipe is rotated by means of apparatus not shown in the drawing. The lower end of the drill pipe is provided with a conventional drill collar and drill bit 13.

The earth formation 15 is illustrated as having been fractured during drilling operations so that drilling fluid 8 flows thereinto and is lost into the formation 15. Such a condition will immediately become evident by a reduction in volume or stoppage of fluids flowing from the mud return line 9.

When it becomes evident that drilling fluid is being lost into an earth formation, it may be desired to know the level at which such a loss is occurring. The level of the fractured zone may be detected by a number of known techniques, including the use of a subsurface thermometer, of a borehole flowmeter, or of radioactive tracers. However, it is not necessary to know the location of the fracture in most cases. The fractured zone is illustrated in FIG. 1 as having occurred near the bottom of the borehole 6, but it is well known that fracturing can occur at any level, even at 1000 or 2000 feet above the bottom of the borehole or at any place up to the casing seat, and not necessarily in the same formation being penetrated at the time that drilling fluid loss is noted.

When loss of drilling fluid is noted, a high water loss slurry is formed at the earth's surface. This slurry comprises a liquid vehicle along with graded, angular propping particles of calcium carbonate, sand, or gilsonite in the complete particle size range of 4 to 200 mesh. Of the above, calcium carbonate particles are preferred. The liquid fraction comprises water, between 10 and 20 pounds of sodium chloride per 42-gallon barrel of liquid vehicle, between 2 and 8 pounds of attapulgite clay per barrel of liquid vehicle, between 5 and 60 pounds of diatomaceous earth per barrel of liquid vehicle. To give the desired density to the slurry, there may be added either between 50 and 600 pounds of barium sulfate and/ or between 50 and 300 pounds of fine, graded, angular particles of one of the particulate materials specified above having a particle size such that 85% passes a 325-mesh screen, per barrel of liquid vehicle. The function of the sodium chloride is to promote higher fluid loss from the slurry. The attapulgite clay provides viscosity to suspend larger propping particles and to control fluid loss to permit rapid buildup of a plug as described below. The diatomaceous earth promotes viscosity without appreciably influencing the filtration rate. The barium sulfate or the fine calcium carbonate adds weight to the slurry inasmuch as the slurry must be sufficiently heavy to control the hydrostatic pressure of earth formations penetrated by the borehole. Preferably, the slurry is near the weight of the drilling fluid.

As mentioned, particulate calcuim carbonate, sand, or gilsonite is added to the liquid vehicle formed as described above in the particle size range of 4 mesh to 200 mesh. The particles are added to the liquid vehicle in the amount of between 80 and 150 pounds of particles per barrel having particle sizes throughout the complete particle range of 4 to 200 mesh. Preferably, to the liquid vehicle is added about 40 pounds per barrel of 40 to 200 mesh particles, about 20 pounds of 30 to 50 mesh particles, about 10 pounds of 20 to 40 mesh particles, about 15 pounds of 10 to 20 mesh particles, and about 35 pounds of 4 to 10 mesh particles. This range of particle sizes in these amounts has been found to give the minimum porosity to the plug formed from the solids deposited in a fracture.

After the slurry is formed, it is injected into the bore of the drill pipe and pumped down the well bore. Two placement techniques may be used depending on well conditions. One technique is illustrated in FIG. 2, and comprises raising the bit to a level at or near the lower end of the surface casing 3 and inside the casing. The slurry is then pumped down the drill pipe with the rams of the blowout preventers 7 open. When the slurry reaches the level of the bit, the rams are closed and the slurry is pumped down the open well bore into the fracture, followed by drilling fluid until the desired pressure is reached. The drilling fluid ahead of the slurry acts as a spearhead fracturing fluid to open the already existing fracture. The second technique is used when the hole volume is very large or when the location of the fracture is positively known. In this method, the bit is positioned at a preselected depth in the well and the slurry is pumped down the drill pipe followed by enough drilling fluid to displace the slurry into the annulus along with some drilling fluid to act as a spearhead. After this placement the bit is raised into the casing and the rams are closed. Drilling fluid is pumped into the drill pipe to squeeze the slurry into the formation. In both cases the squeezing of the slurry into the formation causes an increase of the pump pressure to indicate when sufficient slurry has been squeezed to strengthen the formation. In no case is it absolutely essential to know the location of the fracture, but in all cases it would be helpful if the location were known. The bit is always positioned in the casing when the squeezing operation is being performed in order to avoid sticking of the drill pipe.

During the time that the slurry is being squeezed into the fracture, the first particles are carried far back into the fracture as illustrated in FIG. 3. The particles will gradually fill the fracture and will finally bridge in the fracture and gradually pack outwardly to the wall of the borehole. The larger particles will very effectively bridge the fracture while small particles will flow into the interstices between the larger particles to fill them, and will plug the fracture with a mixture of particles having a minimum porosity. When the hydrostatic pressure at the bottom of the hole reaches the maximum anticipated mud circulating pressure, the pumps are stopped forthwith. The well pressure is maintained at this level for between 30 minutes to 8 hours by intermittent pumping at a low rate. After the prescribed amount of time has elapsed, the pressure is reduced slowly and drilling operations are recommenced as illustrated in FIG. 4. In due course of time a filter cake is built up across the mouth of the fracture bridged by the calcium carbonate particles.

It should be noted that during the time that the slurry is being injected into the open borehole, all of the slurry particles will pass easily through the jet ports 14 into the annulus around the drill pipe without plugging the jet ports.

The effectiveness of the invention will become more apparent from the following description of a field test conducted in a well in West Texas. The well had been drilled to a depth of about 9600 feet when lost returns became so bad that circulation often would be completely lost. A flowmeter survey was run which disclosed two lost return zones, one between 6800 and 6825 feet, and the other between 6830 and 6835 feet. An 80-barrel spearhead of drilling fluid precedes the 300 barrel batch of 11.5 pound/gallon of lost returns slurry prepared as described above. The spearhead and the first 15 barrels of slurry were pumped into the formation at 15 barrels per minute. The injection rate was reduced gradually and was down to 1 b.p.m. after 145 barrels of slurry had been injected. An abrupt rise in squeeze pressure was observed after 163 barrels had been injected, which reached a peak of 460 p.s.i. and then quickly fell back to 360 p.s.i. Subsequent tests showed that a new zone had fractured when the lost returns slurry had sealed the original fracture. In a pressure test and flowmeter survey there was revealed a new lost returns zone at about 5500 feet. Thereupon a 312-barrel drilling mud spearhead was injected into the new fractured zone at 6 barrels per minute, which spearhead was followed with lost returns slurry. Rapid pressure buildup was observed, and injection was suspended after 20 barrels of slurry had entered the fracture. Squeeze pressure reached a maximum of 495 p.s.i. This treatment was regarded as a complete success.

While there has been shown and described a preferred embodiment of the invention, other modifications which do not depart from the scope of the broadest aspects of the invention will be apparent to one skilled in the art.

What is claimed is:
1. The method of preventing loss of drilling fluid in a well penetrating an earth formation that has been accidentally fractured during drilling operations, comprising:
- forming a saline slurry comprising a liquid vehicle, between 80 and 150 pounds of an angular, graded particulate material selected from the group consisting of limestone, marble, sand, and gilsonite per 42 gallons of liquid vehicle, said particulate material having particle sizes in the complete range of 4 to 200 mesh;
- opening the fracture in the fractured zone and forcing the slurry thereinto;
- continuing injection of the slurry until the hydrostatic pressure reaches a value determined by the well chararacteristics; and
- circulating drilling fluid to build up a filter cake across the solids bridging the fracture.

2. The method of preventing loss of drilling fluid in a well penetrating an earth formation that has been accidentally fractured during drilling operations, comprising:
- forming a saline slurry comprising a liquid vehicle including a particulate weighting material, between 80 and 150 pounds of an angular, graded particulate material selected from the group consisting of limestone, marble, sand, and gilsonite per 42 gallons of liquid vehicle, said particulate material having particle sizes in the complete range of 4 to 200 mesh;
- injecting the saline slurry into the well behind a spearhead of drilling fluid;
- increasing hydrostatic pressure in the well bore above maximum hydraulic drilling pressure to open the fracture with the drilling fluid spearhead, and injecting the drilling fluid and the slurry into the fracture;
- continuing injection of the slurry until the hydrostatic pressure reaches a value determined by the well chararacteristics; and
- reducing the hydrostatic pressure in the borehole and recommencing drilling operations to build up a filter cake across the solids bridging the fracture.

3. The method of claim 2 wherein the particulate material is marble.

4. The method of claim 2 wherein the weighting material in the liquid vehicle is barium sulfate.

5. The method of claim 2 wherein the weighting material is calcium carbonate having particle size such that 85% passes through a 325-mesh screen.

References Cited by the Examiner

UNITED STATES PATENTS

| | | | |
|---|---|---|---|
| 2,812,162 | 11/1957 | Mayhew | 166—29 X |
| 3,158,210 | 11/1964 | Cannon | 175—72 |
| 3,208,523 | 9/1965 | Coyle | 166—29 |
| 3,228,469 | 1/1966 | Kern et al. | 166—29 |
| 3,233,673 | 2/1966 | Spain | 166—42 |

JACOB L. NACKENOFF, *Primary Examiner.*

N. C. BYERS, *Assistant Examiner.*